(12) United States Patent
McCahon et al.

(10) Patent No.: US 8,891,162 B2
(45) Date of Patent: Nov. 18, 2014

(54) REGENERATIVE LASER AMPLIFIER

(75) Inventors: Stephen W. McCahon, Tucson, AZ (US); Samvel Sarkisyan, Tucson, AZ (US); Paul B. Lundquist, Vail, AZ (US)

(73) Assignee: Applied Energetics, Inc., Tucson, AZ (US)

(*) Notice: Subject to any disclaimer, the term of this patent is extended or adjusted under 35 U.S.C. 154(b) by 804 days.

(21) Appl. No.: 13/164,506

(22) Filed: Jun. 20, 2011

(65) Prior Publication Data

US 2011/0249318 A1     Oct. 13, 2011

Related U.S. Application Data

(63) Continuation of application No. 11/970,916, filed on Jan. 8, 2008, now Pat. No. 7,982,947.

(51) Int. Cl.
| | |
|---|---|
| H01S 3/30 | (2006.01) |
| H01S 3/10 | (2006.01) |
| H01S 3/23 | (2006.01) |
| H01S 3/067 | (2006.01) |
| H01S 3/094 | (2006.01) |

(52) U.S. Cl.
CPC ............ *H01S 3/235* (2013.01); *H01S 3/06754* (2013.01); *H01S 3/094003* (2013.01); *H01S 3/094015* (2013.01); *H01S 3/094084* (2013.01); *H01S 3/10084* (2013.01); *H01S 3/302* (2013.01); *H01S 3/305* (2013.01)

USPC .......................................... 359/334; 359/348

(58) Field of Classification Search
CPC .................... H01S 3/094015; H01S 3/094046; H04B 10/2916
USPC .................................................. 359/334, 348
See application file for complete search history.

(56) References Cited

U.S. PATENT DOCUMENTS

| | | | | |
|---|---|---|---|---|
| 4,222,011 A | * | 9/1980 | Kurnit | 330/4.5 |
| 4,529,943 A | * | 7/1985 | George et al. | 359/334 |
| 5,221,988 A | * | 6/1993 | Juhasz | 359/247 |

* cited by examiner

*Primary Examiner* — Eric Bolda
(74) *Attorney, Agent, or Firm* — Duft Bornsen & Fettig LLP

(57) ABSTRACT

A laser amplifier system is presented including a pump regenerative amplifier. The amplifier generally has a cavity defined by a pair of end cavity mirrors between which an amplified pump pulse oscillates. The amplifier also includes an interaction cell with a tunable gain medium amplifies laser pulses (e.g., Raman gain). The interaction cell may be positioned within the pump amplifier cavity and an input pulse may be injected into the cavity of the amplifier to transit through the tunable gain medium of the interaction cell. A pump pulse transfers energy via interaction with the input pulse (e.g., Raman interaction) as the pulses counter-propagate through the gain medium of the interaction cell. Amplification of output laser pulses, however, is generally achieved according to the wavelength of the pump laser pulses thereby providing a wavelength dependent, or "tunable", means for amplifying laser pulses.

17 Claims, 5 Drawing Sheets

REGENERATIVE LASER AMPLIFIER

CROSS REFERENCE TO RELATED APPLICATIONS

This patent application is a continuation patent application claiming priority to and thus the benefit of an earlier filing date from U.S. patent application Ser. No. 11/970,916 (filed Jan. 8, 2008), the contents of which are hereby incorporated by reference.

BACKGROUND

In recent years, there have been significant advances in laser technology including solid state laser technology, and lasers are used in numerous applications including scientific research, manufacturing, medicine, security, communications, and a growing number of additional applications. Many of the applications of lasers require lasers that are capable of reliably providing high power outputs or at least outputs with a tunable or selectable output power level. To this end, numerous mechanisms have been developed to try to achieve the required power classes of lasers. For example, certain laser applications involve pulse lasers or lasers operating under pulsed conditions, and a number of amplifiers have been produced to provide an output beam or pulse that provides gain from an input or seed beam or pulse.

High power laser amplifiers have a wide variety of applications and come in many forms, but each amplifier generally functions to amplify the power of an input pulse or beam to output an amplified pulse or beam. Design of laser amplifiers may be limited by factors related to the tolerance of optical components in the amplifier to pulses of high-energy laser light and average power loading. For example, in one large class of amplifier designs, known as regenerative amplifiers, multiple passes through a single gain medium or plural gain media are used for efficient extraction of gain. In these regenerative amplifiers, an optical path is defined around which an input pulse makes a number of passes before being coupled out as an amplified pulse. A regenerative amplifier is a device that is used for strong amplification of optical pulses, e.g., laser pulses with ultrashort pulse durations in the picosecond or femtosecond ranges. Multiple passes through the gain medium, such as a solid state medium, are achieved by placing the gain medium in an optical resonator, together with an optical switch that may be formed by an electro-optic modulator and one or more polarizers. The number of round trips in the resonator is controlled with the optical switch, and when this number is large a high overall amplification factor (i.e., gain) can be achieved.

SUMMARY

The systems and methods (the "utility") presented herein provide laser amplification using interactions within a cell (e.g., Raman interactions) from either co-propagating beams or counter-propagating beams. In this regard, the utility may employ a pump laser for laser pulse application wherein amplification of output laser pulses is tunable according to the wavelength of the pump laser. For example, optical energy in the form of laser pulses has electric and magnetic fields along the path of propagation of the optical energy. The wavelength of the optical energy, and thus the wavelength of the electric field, affects electrons within the interaction cell and thereby varies the index of refraction of the cell. The "tunable" index of refraction of the cell thus provides a controllable interference process within the cell that amplifies laser pulses according to the wavelength of the pump laser. Such a process may be generally referred to as a transient energy transfer that results in a direct amplification of laser pulses and directional power flow without the need for pulse stretching and/or compression found in common Chirped Pulse Amplification (CPA) lasers.

The utility can generally be thought of as a combination of a pump amplifier and an interaction cell-based amplifier (e.g., a Raman amplifier or the like) with the cavities of the two amplifiers overlapping or coinciding. The interaction cell may be positioned within this overlapping portion of the two cavities. In one embodiment, the interaction cell and interaction cell-based amplifier are configured such that a Raman seed or input pulse injected by the interaction cell-based amplifier and a pump pulse oscillating within the pump amplifier interact in the gain medium of the interaction cell. Generally, the input pulse and the pump pulse may move through the gain medium in the interaction cell in opposite directions such that the interaction occurs between the counter-propagating pulses. The gain medium may be solid, gas, or liquid with some embodiments utilizing plasma (e.g., that is created by electrical techniques, by laser ablation of an absorbing media, and/or by laser breakdown in a gas). The input pulse wavelength may, in general, be longer than the pump pulse wavelength as these pulses enter the interaction cell. In some embodiments, the amplifier is configured as a regenerative amplifier, wherein Raman gain is provided via the interaction cell to provide a relatively high power output pulse.

In one embodiment, the pump amplifier is configured as a pump regenerative amplifier with a cavity defined in part by a pair of end cavity mirrors between which an amplified pump pulse oscillates. A Raman amplifier, in this embodiment, is configured as an interaction cell (e.g., a plasma, a gas, or the like) with a gain medium selected to provide Raman gain. The interaction cell is positioned within the cavity of the pump amplifier, and the Raman amplifier operates to inject or couple an input pulse or Raman seed pulse into the cavity of the pump amplifier to transit through the gain medium of the interaction cell. During operation of the laser amplifier system, the pump pulse transfers energy to the input pulse as the two pulses propagate through the gain medium of the interaction cell.

The gain or amplification achieved is due, at least in part, to Raman interaction in this cell, and, in some embodiments, the gain is enhanced by synchronizing the injection of the pump pulse and the input pulse to be concurrent or nearly concurrent. For example, a device may adjust the length of the cavity of the pump amplifier by moving an end cavity mirror so as to modify or set the length of the optical path(s) in the laser amplifier system. The pulses, in this regard, are injected at opposite ends or ports of the cell such that energy transfer occurs during counter-propagation of the pulses, and the level of gain is increased by having the input pulse transit through the interaction cell at least twice and to interact with a pump pulse on each such transit. The Raman amplifier may also be configured as a regenerative amplifier with a mirror provided outside the cavity of the pump amplifier that with one of the end cavity mirrors of the pump amplifier acts to define the cavity of the Raman amplifier (e.g., an optical path for the input pulse into the cavity of the pump amplifier and through the interaction cell). A switch assembly may be included to selectively eject the input pulse after a select number of passes through the interaction cell or after gain causes the magnitude of the Raman pulse or input pulse to exceed a particular threshold level. Alternatively or additionally, pair of mirrors may be provided adjacent to the interaction cell to shape the input pulse and/or pump pulse to increase energy transfer due to Raman interaction in the cell.

DETAILED DESCRIPTION OF THE DRAWINGS

Figure 1:
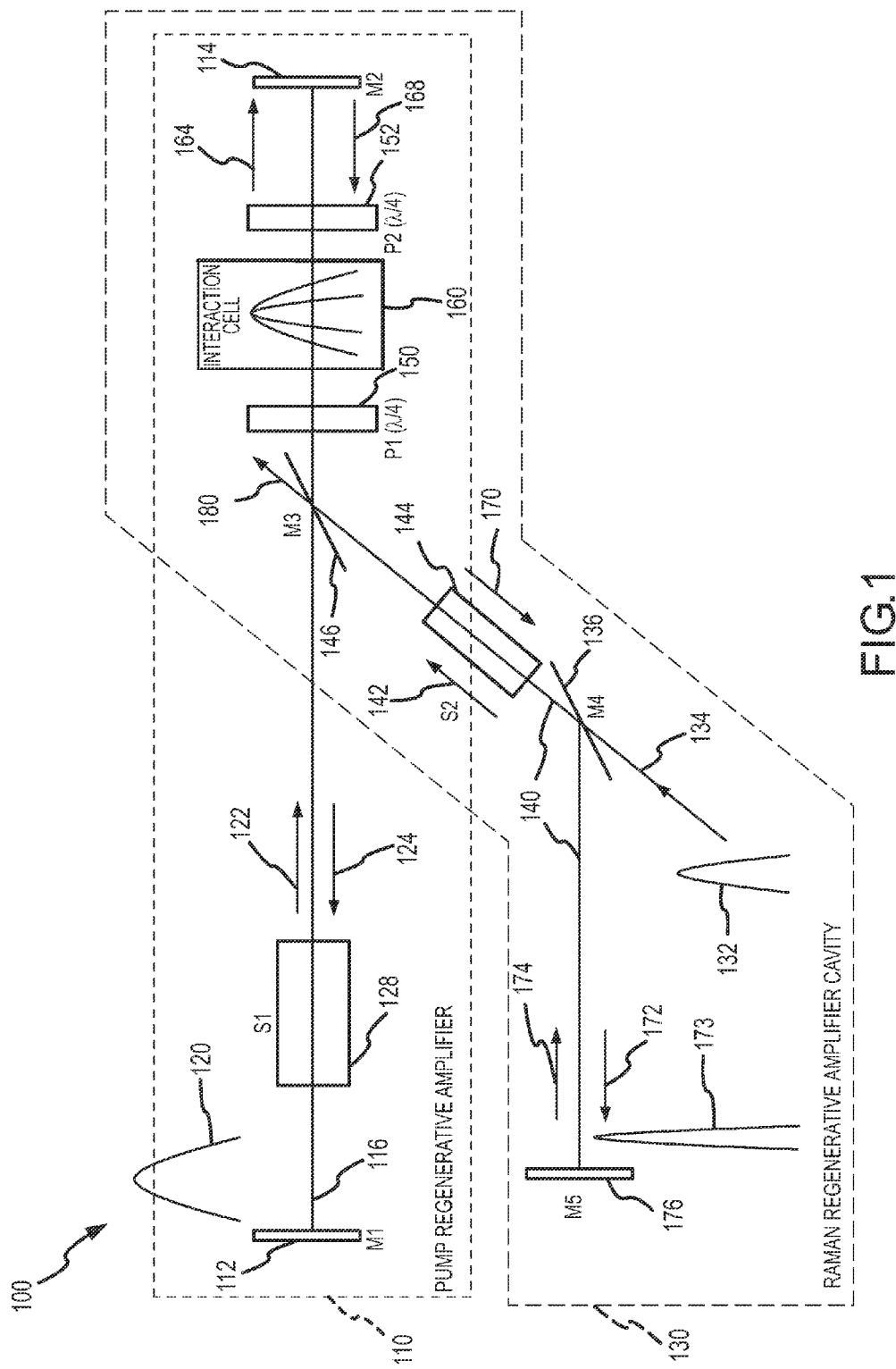
FIG. 1 illustrates in functional block form a laser amplifier system as may be used to generate an amplified pulse.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope and spirit of the invention as defined by the claims.

Briefly, the laser amplifier systems and methods provide for amplifying laser pulses to provide output pulses of a desired and, in some embodiments, selectable energy magnitude and/or wavelength. Briefly, exemplary embodiments of the laser amplifier systems utilize a pump regenerative amplifier to provide amplification of a Raman seed or input pulse. In some cases, a Raman amplifier is also included in the laser amplifier systems with its cavity overlapping or coinciding with at least a portion of the pump regenerative amplifier such that interaction between the seed pulse and a pump pulse from the pump regenerative amplifier occurs in an interaction chamber (e.g., a plasma chamber, Raman cell, or the like) positioned within this overlapping or coinciding portion of the two cavities. In some preferred embodiments, the Raman amplifier is arranged as a regenerative amplifier and the seed pulse interacts with the pump pulse in two or more passes through the interaction chamber before being coupled out of the laser amplifier system as an amplified pulse or output with desired gain or amplification.

Figure 2:
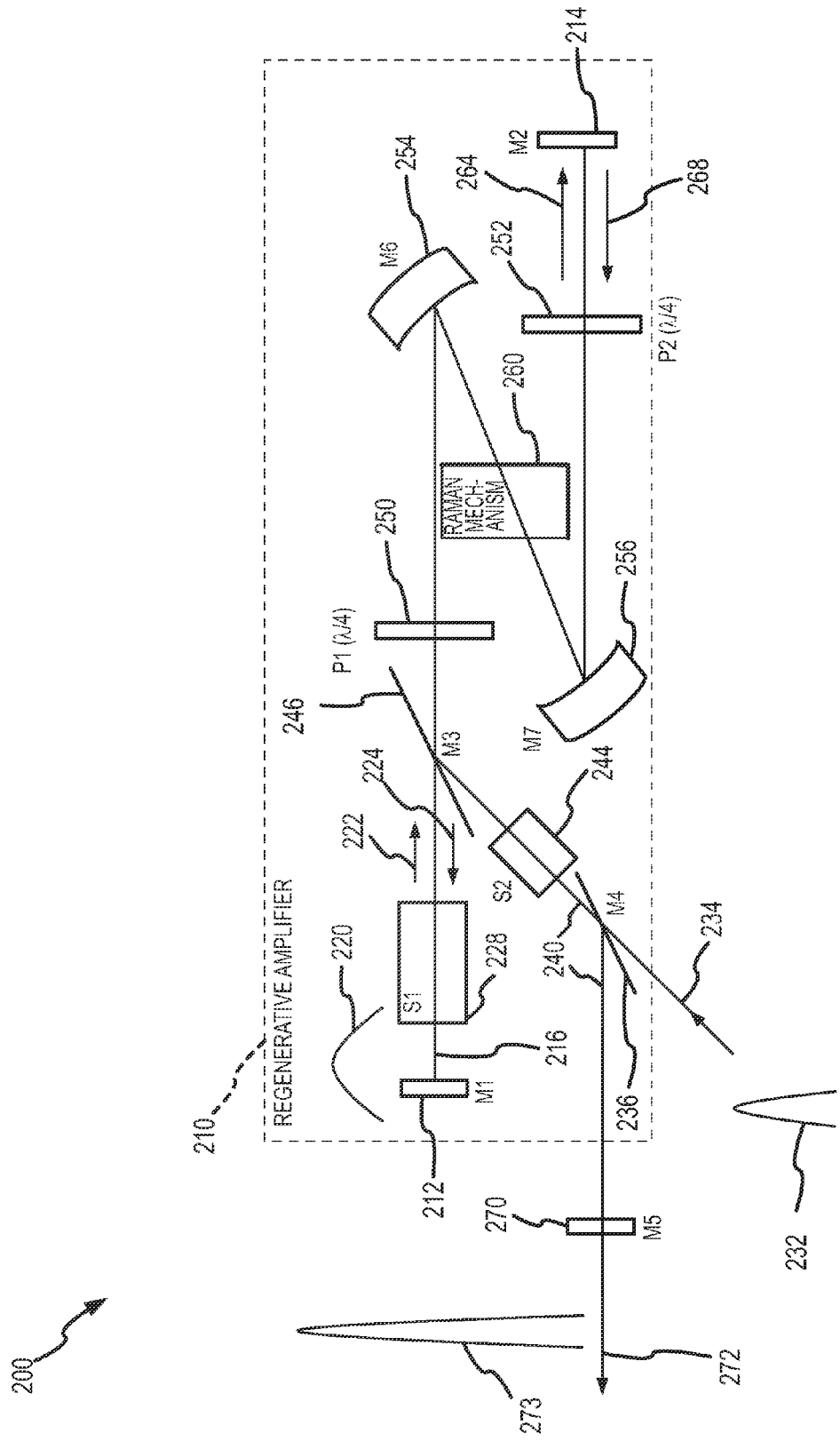
FIG. 2 is a functional block diagram similar to that of FIG. 1 illustrating a laser amplifier system with additional mirrors or optic devices provided for pulse beam shaping.

The following description begins with a discussion of two embodiments of laser amplifier systems with reference to FIGS. 1 and 2 illustrating in schematic or functional block form two exemplary embodiments of pump and Raman regenerative amplifiers. In some cases, though, the Raman amplifier may be operated as a single pass amplifier. The description then provides a discussion with reference to FIG. 3 of a laser source assembly that can be used with laser amplifier systems, such as those of FIGS. 1 and 2, to provide input pulses (e.g., a Raman seed pulse and a pump or amplification pulse) with the illustrated source assembly providing both input pulses. Of course, in other cases, the two input pulses may be provided by separate laser sources. Next, the description provides one physical implementation of a laser amplifier system according to the concepts of the invention that comprises fiber for defining at least portions of the pump regenerative amplifier and the Raman amplifier, e.g., uses fiber to define optical paths in the laser amplifier system or to provide a fiber-based laser amplifier. The description then discusses the laser amplifier system shown in FIG. 5, which includes some variations from the system of FIG. 1 including drivers for resonator tuning.

FIG. 1 illustrates a laser amplifier system 100 of an embodiment that is useful for providing high gain using an "in cavity" Raman amplifier. As shown, the system 100 includes a pump regenerative amplifier 110 and a Raman regenerative amplifier 130 with its cavity overlapping or coinciding with a portion of the cavity of the pump regenerative amplifier 110. The pump regenerative amplifier 110 includes a pair of mirrors or cavity end mirrors 112, 114 that reflect pulses incident on their surfaces to define an optical path 116 for pulses and define an oscillator of the amplifier 110, which in this case coincides with the amplifier's cavity. A pulse 120 is provided or injected on the optical path 116, such as from a laser source or seed laser (e.g., a small laser diode, a short-cavity fiber laser, a solid state laser, a mode-locked laser, or the like not shown in FIG. 1) used to provide a seed pulse (such as a low power pulse) to the pump regenerative amplifier 110, and is transmitted to a switch or switch assembly 128.

The regenerative amplifier 110 may take many forms, and, in this regard, the switch assembly 128 may include a variety of components to provide functionality of the amplifier 110. In simplest form, the switch assembly 128 may include a switch or coupler for allowing a seed pulse 120 to pump a particular wavelength into the amplifier 110 that is oscillated along the path 116 between the cavity end mirrors 112, 114 for use in the Raman amplifier 130. As such, virtually any laser could be used as a pump laser. The switch assembly 128 also typically includes an amplification mechanism or components for amplifying the pump pulses 122, 124. The specific arrangement of such amplification mechanism or components is not limiting to the invention and is used to provide amplification of optical pulses such as pulses with ultrashort pulse durations in the picosecond or femtosecond domain. The optical components provided to this end include gain media (such as a direct-bandgap semiconductor, a laser crystal or glass such as Ti:sapphire, Nd:YAG, Yb:YAG, or Yb:glass, a ceramic gain media, laser dyes, gases or gas mixtures, or other useful gain media) that may be pumped for some time to accumulate a desired amount of energy prior to injection of the initial or seed pulse 120 (or the gain medium can be pumped in a continuous or periodic fashion during operation of the amplifier 110).

The pulses 122, 124 make a select number of round trips (e.g., 1 to 100 or more) between the mirrors 112, 114 (e.g., these and other cavity end mirrors may be flat, high reflecting mirrors) being amplified in the gain medium of switch assembly 128 before being released by a second switch or coupler used to allow the pump pulses 122, 124 to exit the pump regenerative amplifier 110. The number of trips on the optical path 116 is controlled by this second switch, which as with the first switch in the assembly 128, may include one or more of an electro-optic switch, an acousto-optic switch, a thin-film polarizer (TFP), a Pockels cell, a Faraday cell or rotator, quarter wave plates, or the like. Additionally, the switch assembly 128 in some preferred embodiments includes a mode coupling dynamic control that operates to maintain an overlap in the interaction cell or chamber 160 between the pump pulses and the Raman pulse (e.g., the seed or input pulse input to the amplifier system 100 for gain or amplification in the interaction cell 160).

One important aspect of the amplifier system 100 is the inclusion of a Raman amplifier 130 with its cavity partially overlapping the cavity of the pump regenerative amplifier 110. As shown, the cavity of the Raman regenerative amplifier 130 is defined by a mirror or cavity end mirror 176 and mirror 114 (which also defines oscillator or resonator of pump regenerative amplifier 110), and these mirrors 114, 176 define an optical path 140 for the amplifier 130. The optical path 140 is further defined by polarization-dependent mirrors 136 and 146, which may be TFPs or other optics that are selectively transmissive and reflective to pulses such as of a particular polarization, as is explained below as part of the description of the operation of the system 100. The amplifier 130 further includes a coupler 134 for receiving an injected input or seed pulse 132 for amplification such as from a seed laser or other source (not shown, and which may be provided as part of amplifier 130 or, more typically, as a separate device) as discussed above for pulse 120 and, typically, the pulse 132 is an initial laser pulse characterized as being an ultrashort pulse (e.g., a pulse shorter than the pump pulse in pump regenerative amplifier 110) at a wavelength that is longer than the pump pulse in the pump regenerative amplifier 110. In the optical path 140 of the Raman regenerative amplifier 130, a pair of quarter wave plates 150, 152 are provided, such as on the inlet and outlet of the interaction cell 160, to make circularly polarized light within the interaction cell 160.

The amplifier 130 includes a switch assembly 144 that may include a polarization rotator such as a Faraday's cell, a Pockels cell, or the like to selectively rotate the polarization of a pulse 142 (e.g., the input or seed pulse 132 or an amplified pulse 172 shown at 173 that is reflected as pulse 174 to the switch assembly 144) to cause it to either be ejected or transmitted by mirror 146 as amplified output 180 or to be reflected from mirror 146 to be injected onto path 116 to transit through wave plates 150, 152 and interaction cell 160. The polarization rotator of switch assembly 144 may be electronically controlled or take a switch form similar to the embodiments discussed for switch components for switch assembly 128. The switch 144 generally operates in response to control signals from a controller (not shown) so as to operate the amplifier 130 as a regenerative amplifier with pulses making more than one pass through the interaction cell 160, but this is not required and some embodiments call for the ejection of the output pulse 180 after a single pass on the optical path 140 (e.g., one round trip through or two passes through the interaction cell 160).

Energy is transferred from pump pulses 120 to the Raman pulses 132 in the interaction cell 160. In other words, the interaction cell 160, which is positioned within the cavity of the pump regenerative amplifier 110, is used to provide gain to the Raman pulse 132 and an amplified Raman pulse 180 is later coupled with an output of the amplifier system 100. The interaction cell 160 may take a number of forms and, for example, may include a plasma chamber, a Raman cell, or the like. Generally, the cell 160 is adapted to provide Raman gain or optical gain arising from stimulated Raman scattering, and, in some embodiments, the cell may include a transparent solid material (e.g., optical fibers or bulk crystal), liquids, and/or gases (such as gases under the influence of intense pump light). In some preferred embodiments, a plasma is provided in the interaction cell to obtain the Raman interaction.

During operation of the laser amplifier system 100, the pump regenerative amplifier 110 is operated to generate pump pulses 122, 124 that travel on the optical path 116 through the interaction cell 160 twice in each round trip between the cavity end mirrors 112, 114. The pump pulses may be formed by amplification in a gain medium in the switch assembly 128 of pump seed pulses 120. An input Raman pulse 132 is injected into the Raman regenerative amplifier 130 by transmission into the cavity (or overlapping cavity portions of the amplifiers) via polarization dependent mirror 136. For example, a horizontal polarization Raman seed pulse 132 may be transmitted into the cavity of amplifier 130 through mirror 136. The switch 144 may act on this pulse as shown with arrow 142 in response to a control signal or by electronic control to rotate (e.g., with a Faraday's rotator or Pockels cell) the polarization of the Raman pulse 132 to vertical polarization (e.g., to rotate the polarization 90 degrees, such as from P to S polarization or vice versa). In this example, the mirror 146 would be selected or adapted to reflect horizontally polarized pulses on the path 140 at the Raman pulse 132 wavelength. The Raman and pump pulses pass through the quarter wave plates 150, 152 such that circularly polarized light is provided to the interaction cell 160. The Raman pulses are shown at 164 and 168 to be reflected from the cavity end mirror 114 back along path 140 to again pass through the plates 150, 152 and, more significantly, the interaction cell 160.

In cavity Raman amplification or gain is achieved in the interaction cell 160 as energy is transferred from the amplified pump pulses 122, which are transmitted through the mirror 146 into cell 160, to the input or seed Raman pulses 142 (that are reflected off mirror 146) and 168 (that are reflected off mirror 114). As can be seen in FIG. 1, the pump pulses and Raman pulses interact in the interaction cell 160. The interaction and power transfer can be when the pulses are propagating through the cell 160 in the same direction (i.e., co-propagating beams), but, in one embodiment, the pulses interact while propagating in opposite directions (i.e., counter-propagating beams). Further, the interaction may occur between a Raman pulse and a pump pulse as the Raman pulse travels twice through the interaction cell 160. Hence, interaction can occur in each direction that the Raman pulse transits through the cell 160 to increase the gain achieved (e.g., a pulse 142 that enters the cell 160 will interact with a pump pulse that has been reflected from the mirror 114 and a Raman pulse 168 that has been reflected from the mirror 114 will also interact with a pump pulse 122 transmitted from the switch 128 such that interaction or amplification occurs in both flow directions on the optical path 140 through the cell 160). During typical operating conditions of the amplifier system 100, the pulse length of the Raman pulse 132 is shorter than the pulse length of the pump pulse 120.

The amplified Raman pulse then exits the interaction cell 160 passes through the quarter wave plate 150 and is reflected by mirror 146 toward switch 144. The switch 144 generally does not alter the polarization at this point, and the pulse 170 is ejected from the switch 144 where it reflects off of the mirror 136 toward mirror 176 as shown at 172. The amplified pulse 172 may take the form as shown at 173 in the first pass or transit on path 140 or it may take a number of passes or trips through the interaction cell 160 to obtain a desired gain or other output characteristics. The mirror 176 reflects the beam or pulse 174 back to mirror 136, which directs it again through the switch 144. The switch 144 is controlled either to allow the Raman pulse to pass through without polarization rotation such that it continues to circulate within the Raman regenerative amplifier 130 or to rotate the polarization of the Raman pulse, such as with a Pockels cell, such that it is transmitted through mirror 146 as an amplified Raman pulse or Raman laser output. For example, the mirror 146 may be configured to be highly transmissive to vertically polarized pulses at the Raman pulse wavelength, and the switch 144 may be controlled to rotate the polarization of the amplified Raman pulse from horizontal to vertical (or vice versa depending on the transmissivity and reflectivity of the polarization-dependent mirrors 136, 144, which may be provided as one or more optical components).

The number of trips or passes through the Raman regenerative amplifier 130 is controlled by operation of the switch 144 and is selected or set to achieve a desired level of gain. The number can be varied to achieve a desired gain or amplification factor using a variety of pump pulses, differing switch assembly 128 configurations, and/or providing differing input pulses or Raman seed pulses 132. The laser amplifier system 100 may also include one or more devices for synchronizing interaction between the pump and Raman pulses in the interaction cell 160. For example, the pulses may be synchronized by controlling the timing of injection of the pulses 120 and 132 into the amplifiers 110, 130. In addition to these controllers or mechanisms, a mechanism or mechanisms may be provided to vary or tune the roundtrip cavity time in one or both of the cavities of the amplifiers 110, 130. For example, mechanisms may be provided for varying or setting the position of one or more of the cavity end mirrors 112, 114, and 176 so as to set the cavity length of the amplifiers 110, 130 (e.g., to adjust the length of the resonator). Such mechanisms may include an optical feedback system (not shown) for positioning the mirrors 112, 114, 176 and/or timing circuitry for determining roundtrip travel time of the pulses in the amplifier cavities or on optical paths 116, 140. This tuning of the cavity length is useful for synchronizing times at which the counter-propagating or co-propagating pulses enter ports or ends of the cell 160 such that pulses better or more fully interact in the interaction cell 160.

FIG. 2 illustrates another embodiment of a laser amplifier system 200 that is similar to the system 100 shown in FIG. 1 but with several modifications or differing features. Again, the system 200 may be considered an "in-cavity" Raman amplifier because a Raman amplifier is provided in the system 200 with a pump regenerative amplifier 210 with an overlapping of the two amplifier cavities. As shown, the system 200 includes a pump regenerative amplifier 210 with an oscillator and/or cavity defined by mirrors 212, 214. An optical path 216 is defined between these end cavity mirrors 212, 214 and a pump pulse 220 is injected onto the path 216 (such as from a seed laser or laser source (not shown in FIG. 2)). Regenerative pump amplification is achieved in switch assembly 228, and the assembly 228 may be configured as discussed with reference to switch assembly 128 of system 100 to provide amplified pump pulses 222, 224 on path 216 that are injected into a Raman mechanism 260 (e.g., a plasma chamber, Raman cell, or the like for providing Raman gain).

On the Raman amplifier side, the system 200 includes an inlet or injection coupler 234 through which a seed or input pulse 232 is injected and is transmitted through polarization dependent mirror 236 onto optical path 240. The pulse 232 then passes through switch assembly 244, which may be configured similar to the switch assembly 144, where it may have its polarization rotated (e.g., 90 degrees). The rotated pulse then is reflected off the mirror 246 through quarter wave plates 250, 252 and is reflected off of cavity end mirror 214 as shown with pulses 264 and 268. The mirror (or TFP) 270 and mirror 214 define the cavity of the Raman amplifier, and this cavity overlaps with the cavity of the pump regenerative amplifier 210. As with the system 100, the Raman amplifier of system 200 includes a Raman mechanism 260 in which Raman gain is achieved by interaction of the Raman input or seed pulse 232 and the pump pulses 220, such as in both directions during counter flow or during counter propagation of the two types of laser pulses through the media in the cell 260 or during co-propagation through the cell 260.

The Raman amplifier differs from that shown in FIG. 1 in that mirrors 254 and 256 have been provided on the inlet and outlet side of the Raman mechanism 260, and these mirrors 254, 256 are inserted into the optical path of the overlapping portion of the two amplifier cavities to provide additional control over the pump and Raman pulse beam shapes as they enter the Raman mechanism 260. For example, the shapes of the pulses may be altered prior to injection into the Raman mechanism 260 such that the pulse beam shape of the two pulses is better suited for interaction or for transferring energy from the pump pulse to the Raman pulse (e.g., during counter-propagation or co-propagation) in the cell 260. As with the system 100, the amplified Raman pulse may have its polarization rotated by the switch 244 or left unmodified such that it makes a selectable number of passes or trips through the Raman mechanism 260 to achieve a particular gain or amplification factor. In the system 200, the amplified Raman pulse may be ejected from the system 200 as shown at 272 with parameters (e.g., an energy and length) as shown at 273 by being transmitted through the mirror 270 (e.g., a polarization-dependent mirror that is transmissive to the polarization and wavelength of the output pulse 272).

The Raman mechanism 260 may take the form of a plasma chamber or be provided as nearly any useful type of Raman cell. In one embodiment, the Raman mechanism 260 includes a Raman cell that uses a gas or liquid for the Raman interaction. This is a useful embodiment for obtaining a specific wavelength shift during the Raman interaction between the input pulse and the pump pulse in the Raman mechanism 260. For example, a specific gas may be chosen for use in a Raman cell to obtain a desired wavelength shift in the input pulse or Raman seed pulse that is being amplified in the system 200. In another embodiment, the Raman mechanism 260 uses a Raman cell that uses plasma for the Raman interaction. As with the use of a gas or liquid, the use of plasma in a Raman cell or in a plasma chamber is effective for obtaining a particular wavelength shift in the Raman interaction that depends on the electron density of the plasma. In each of these embodiments of the Raman mechanism 260 (and interaction cell 160), the amplifier system 200 is used to provide amplification by providing Raman interaction within the cavity of a pump regenerative amplifier and in addition to energy gain due to such interaction, the amplifier systems can be used to achieve a desired wavelength shift in the output pulse or amplified pulse, e.g., by selecting the gain medium in the Raman mechanism 260 or in the interaction cell 160 of FIG. 1 and by selecting the number of trips or passes of the pulse that is being amplified (i.e., operate the Raman amplifier as a single pass amplifier or as a regenerative amplifier with each amplified pulse making at least 2 trips through the Raman cell, plasma chamber, or the like).

When plasma is used as the gain medium or interaction medium in the Raman mechanism 260, the plasma may be created or provided in a number of ways. For example, but not as a limitation, the plasma may be created through electrical techniques such as through use of inductive coupling, electrical discharge, radio frequency (RF) excitation, RF excitation capillary tubes, and the like. In other cases it may be useful to form the plasma through laser breakdown in a gas. The breakdown may be achieved by an additional laser source (not shown), by a pump laser, or by other laser inputs. In still other embodiments, the plasma is created in the cell or chamber of the mechanism 260 (or interaction cell 160) through the use of laser ablation of an absorbing media. Other methods of providing plasma for use in Raman interaction will be apparent to those skilled in the laser and optical arts and are considered within the breadth of this description.

Figure 3:
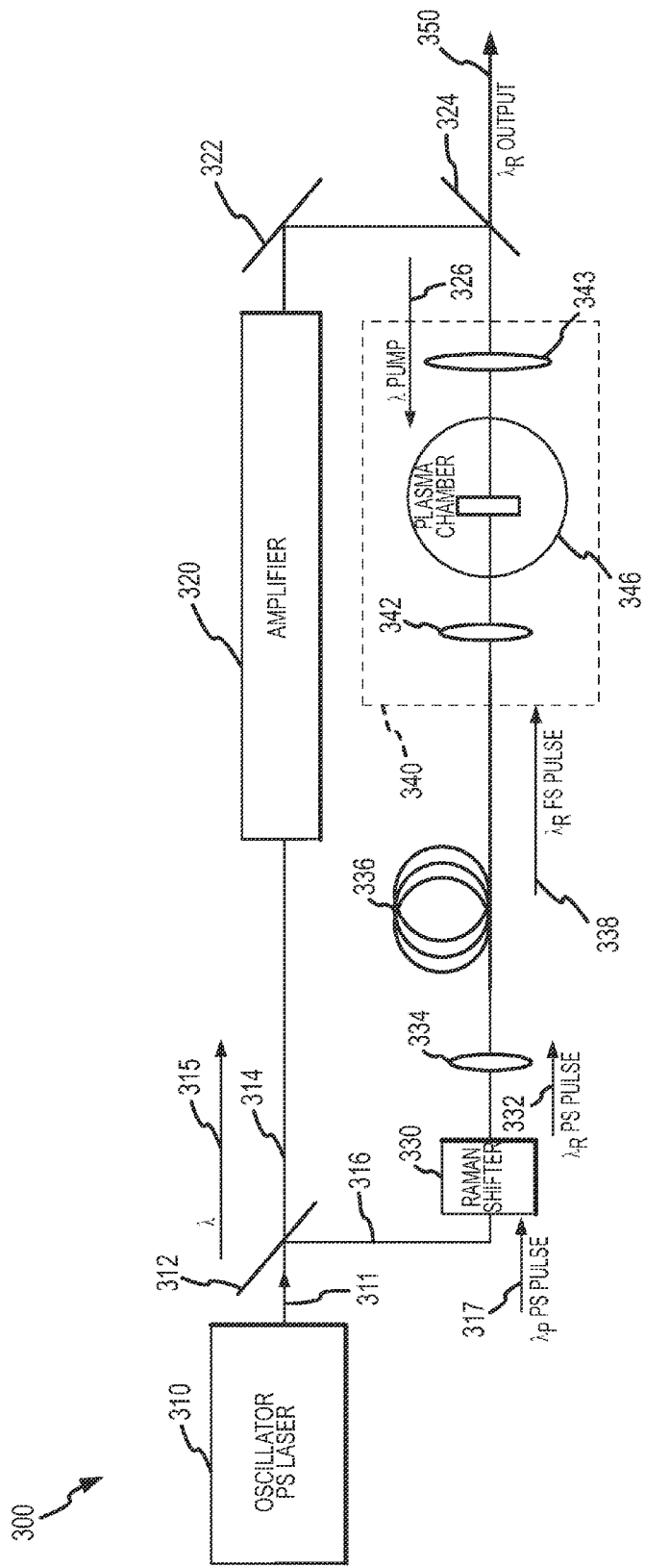
FIG. 3 is a schematic of a laser system that may be used with or may incorporate the laser amplifier embodiments of FIGS. 1, 2, and 4 to provide the pump and seed pulses to the pump and Raman regenerative cavities.

As discussed above with reference to FIGS. 1 and 2, the initial laser pulse 120, 220 may be provided by a first laser source while the seed or input pulses 132, 232 to the Raman amplifier (e.g., to the cell 160 or Raman mechanism 260) are provided by a second laser source. In other cases, though, it may be desirable to generate these two input pulses to the laser amplifier systems of the invention with a single laser source. With this in mind, FIG. 3 illustrates a laser system 300 in which a single laser source 310 is used to generate an input pulse that is used to provide the pump regenerative amplifier input pulse as well as the Raman amplifier input or seed pulse. In system 300, either of the laser amplifier systems 100 or 200 may be used to achieve a desired amplification or modification of the Raman amplifier input or seed pulse, with either of these systems 100, 200 or another similar system being provided as a laser amplifier system 340. For ease of description, the laser amplifier system 340 is shown in simplified form to include a plasma chamber 346 (but this could be another form of a Raman cell or a differing type of interaction cell) to achieve interactions along with inlet/outlet optics 342, 343 for injecting the pump and Raman pulses 326, 338 into the chamber 346. Of course, the other components shown in FIGS. 1 and 2 may be provided as needed to achieve the laser amplifier systems features described herein such as Raman interaction between a pump pulse and Raman pulse in counter-propagation through a gain medium such as gas, liquid, or plasma in the chamber 346.

As shown, the laser source 310 is provided in this example as an oscillator picosecond (ps) laser that outputs an initial laser pulse beam 311. For example, the initial pulse 311 may be a 50 ps, 100 milliJoule (mJ) pulse that is injected into the system 300 to be incident on the splitter 312. A wide range of laser output devices may be used for source 310 to provide a wide range of pulse durations (e.g., ultrashort pulses in the ps and fs domains) and energies, with the example shown only being provided for illustration purposes. The beam splitter 312 acts to split the initial pulse 311 into pulses 315, 317 that are directed along optical paths 314, 316, which may be considered the pump regenerative amplifier input path and the Raman amplifier input path, respectively.

On the pump regenerative amplifier input path 314, the injected laser pulse 315 is amplified by amplifier 320 prior to being redirected by mirrors 322 and 324, with surfaces that are highly reflective to pulses at the pump wavelength. The pump pulse 326 is then injected into the laser amplifier system 340 (e.g., for use as the laser pump source and/or pump seed similar to pulses 120, 220 of FIGS. 1 and 2 to a pump regenerative amplifier such as amplifiers 110, 210). The pump pulse 326 is then used for interaction in the plasma chamber or other Raman cell 346 with a Raman pulse 338.

On the Raman amplifier input path 316, the initial or injected laser pulse 317 is used to generate an ultrashort pulse 332 (i.e., shorter than the pulse 317) at a wavelength that is longer than the initial pump source 326. As shown, this functionality is implemented in the system 300 by placing a Raman shifter or other shifter 330 in the path 316 such that the pulse 317 passes through the shifter 330 to generate a pulse 332 at a longer wavelength. The longer wavelength light or pulse 332 is then focused with lens 334 onto a fiber (or photonic crystal or other optics) 336 that is designed to both broaden the bandwidth of the shifted wavelength pulse 332 and to also compress it to a pulse of length that is shorter than the initial pulse 317 (e.g., ps duration pulse to a fs duration pulse). The longer wavelength and compressed pulse 338 is then injected into or transmitted to the laser amplifier system 340 (e.g., as Raman input or seed pulses 132, 232 shown in FIGS. 1 and 2) for amplification and/or modification in the plasma chamber or Raman cell 346 due to Raman interaction with the pump pulse 326 and then ejected as amplified output 350. In some embodiments, a spectral filter (not shown) may also be provided in the path 317 to filter or eliminate select wavelengths from the initial pulse 317 prior to or after its injection into the laser amplifier system 340.

Figure 4:
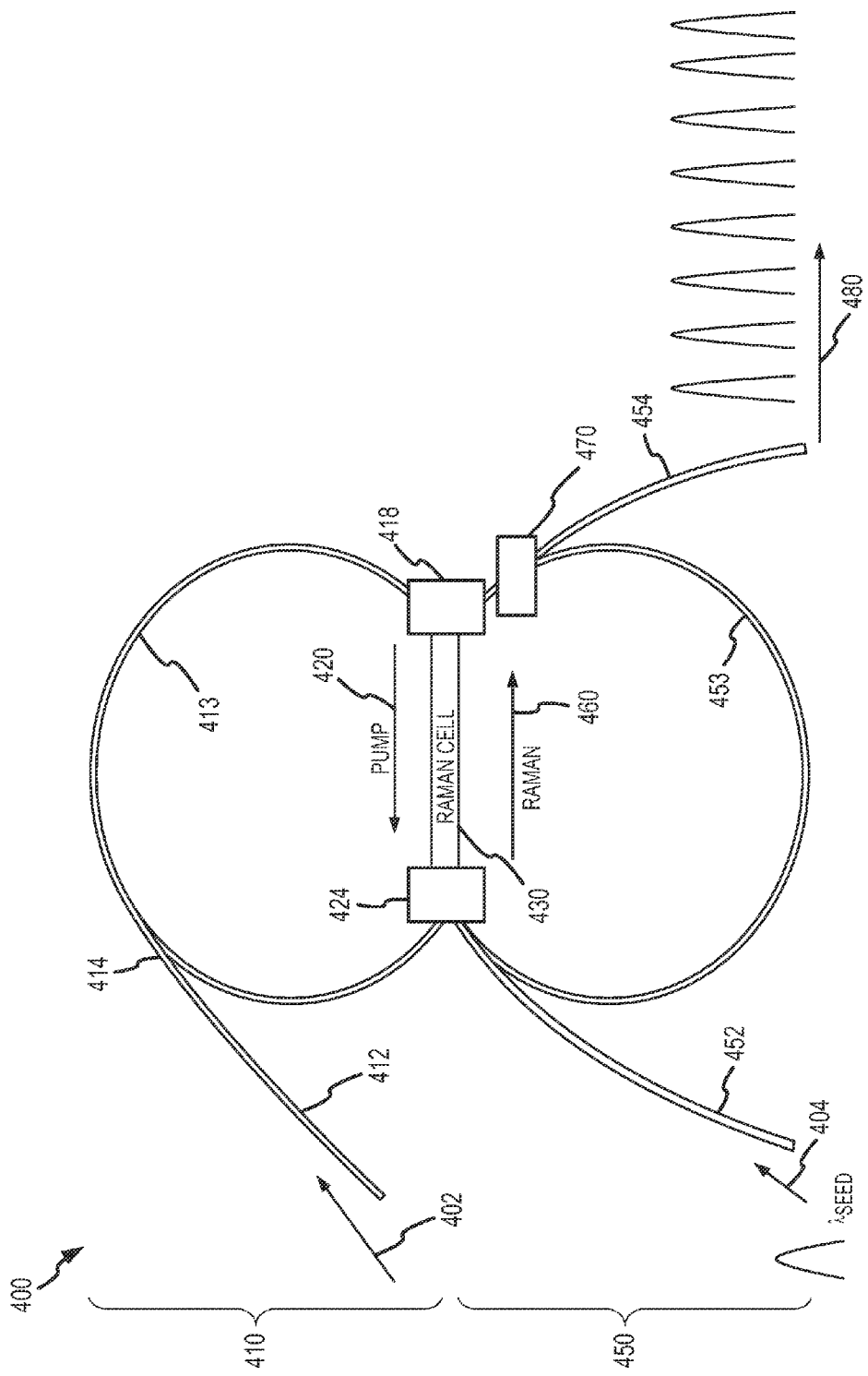
FIG. 4 illustrates a laser amplifier system showing use of fiber to form a fiber-based, high power amplifier.

The laser amplifier systems of the present invention may be manufactured or assembled using a variety of physical implementations. For example, but not as a limitation, it may be useful to fabricate the laser amplifier systems using all or a substantial amount of optical fiber and fiber-based components. With this in mind, FIG. 4 illustrates a fiber-based laser amplifier system 400 that includes a pump regenerative amplifier portion 410 and a Raman regenerative amplifier portion 450. The system 400 also may be thought of, more simply, as showing that a pump amplifier and a regenerative Raman amplifier that are combined, as described herein, may be coupled using fiber.

As shown, the pump regenerative amplifier portion 410 receives a pump pulse 402 in inlet branch 412 of fiber loop 413 that is connected by a junction 414 (e.g., a Y junction or other coupler). For example, the pump pulse may be received from pump regenerative amplifier in the form of a 50 kHz pulse or the like as may be provided by amplifiers 110, 210 of FIGS. 1 and 2 or as pump pulse 326 as shown in FIG. 3. The pump pulse 402 transits the loop 413 and is fed as shown with pulse 420 into an interaction cell 430 (shown as a Raman cell in FIG. 4) via coupler 418. The coupler 418 may be a wavelength division multiplexing coupler or wavelength division multiplexer (WDM) to allow the pump and Raman pulses to be combined, transmitted together through the interaction cell 430, and separated again (e.g., at each end of the cell 430) even though the pulses typically have different wavelengths as discussed above. The pump pulse 420 exits the cell 430 via coupler 424 (e.g., a WDM or the like) and is transmitted into fiber loop 413 where it may be again passed into the cell 430 when the system 400 is operated as a regenerative amplifier and not as a single pass amplifier.

In the Raman amplifier portion 450, the Raman seed or input pulse 404 is injected into an inlet branch 452 of fiber loop 453 that is connected via a Y junction or other coupler 424. The Raman seed 404 is injected into the interaction cell 430 as shown by Raman pulse 460 such as via WDM 424. As shown, the Raman pulse 460 and pump pulse 420 counter-propagate in the cell 430 during Raman interaction but in other cases co-propagation may be utilized in the cell 430. The amplified Raman pulse exits the cell 430 via the coupler 418 and is output or ejected through an output branch 454 of the fiber loop 453 as amplifier output pulse or amplified Raman pulse 480, with the branch 454 coupled to the loop 453 with coupler 470 (e.g., a 10/90 coupling or the like). The coupler 470 may further include (or it may be provided separately) a fiber modulator adapted to control output of the Raman regenerative amplifier 450 by selecting the magnitude of each pulse 480 to exit the cavity 450 via outlet branch 454. When Raman pulses 460 have not yet received acceptable gain or amplification, the Raman pulses 460 are passed around the loop for another pass through the interaction cell 430 for additional interaction with pump pulses 420 (e.g., additional Raman interaction to provide energy transfer from the pump pulses 420 to the Raman pulses 460). The fiber-based amplifier system 400 in some embodiments is able to multiply the laser repetition rate as shown at 480. Although not shown, a pulse delay mechanism may be provided on either or both the pump fiber 413 or the Raman fiber 453 to synchronize the interaction of the pulses 420, 460 within the Raman interaction cell 430.

Although the systems and methods have been described above and illustrated in the figures with a certain degree of particularity, it is understood that the present disclosure has been made only by way of example and that numerous changes in the combination and arrangement of parts can be resorted to by those skilled in the art without departing from the spirit and scope of the invention, as hereinafter claimed. For example, the number of interactions in the interaction cell (e.g., Raman cell, plasma chamber, "active cells", such as active dyes, active crystals, non linear crystals, or the like) may be varied to practice the invention. Typically, the cavities of the combined amplifiers and the timing of an interaction pulse and the pump pulse are selected so that the pump and interaction pulse interact at least twice per pump oscillation cycle. In a counter-propagating interaction embodiment, this may involve the pump pulse traveling a first direction or "right" while the interaction pulse travels a second opposite direction or "left" in a first pass or interaction in the cell or chamber. Then during the second half of the pump oscillation cycle, the pump pulse travels to the "left" while the interaction pulse travels to the "right" in a second pass or interaction in the cell or chamber.

The pump and Raman cavities of the two amplifiers may be operated to oscillate at the same or different frequencies. Different oscillating frequencies may be used, for example, provided that cavity lifetimes are commensurate (e.g., $n\tau_p = m\tau_R$ for some integers n and m). Such an embodiment may be useful to allow for buildup of the pump source prior to energy transfer to the Raman pulse being initiated in a laser amplifier system of the invention. The switches used in the Raman amplifier and the pump regenerative amplifier may, as discussed, take many forms to practice the invention and the above description is not intended to be limited to only the examples provided. For example, the switches of either the pump or the Raman amplifier cavities may be adjusted to provide or account for: quasi continuous wave (CW) or Raman mode; burst operation of the pump amplifier or the Raman amplifier; linear or non-regenerative amplifier mode for the pump pulse(s); and linear or non-regenerative amplifier mode for the Raman pulse(s).

Figure 5:
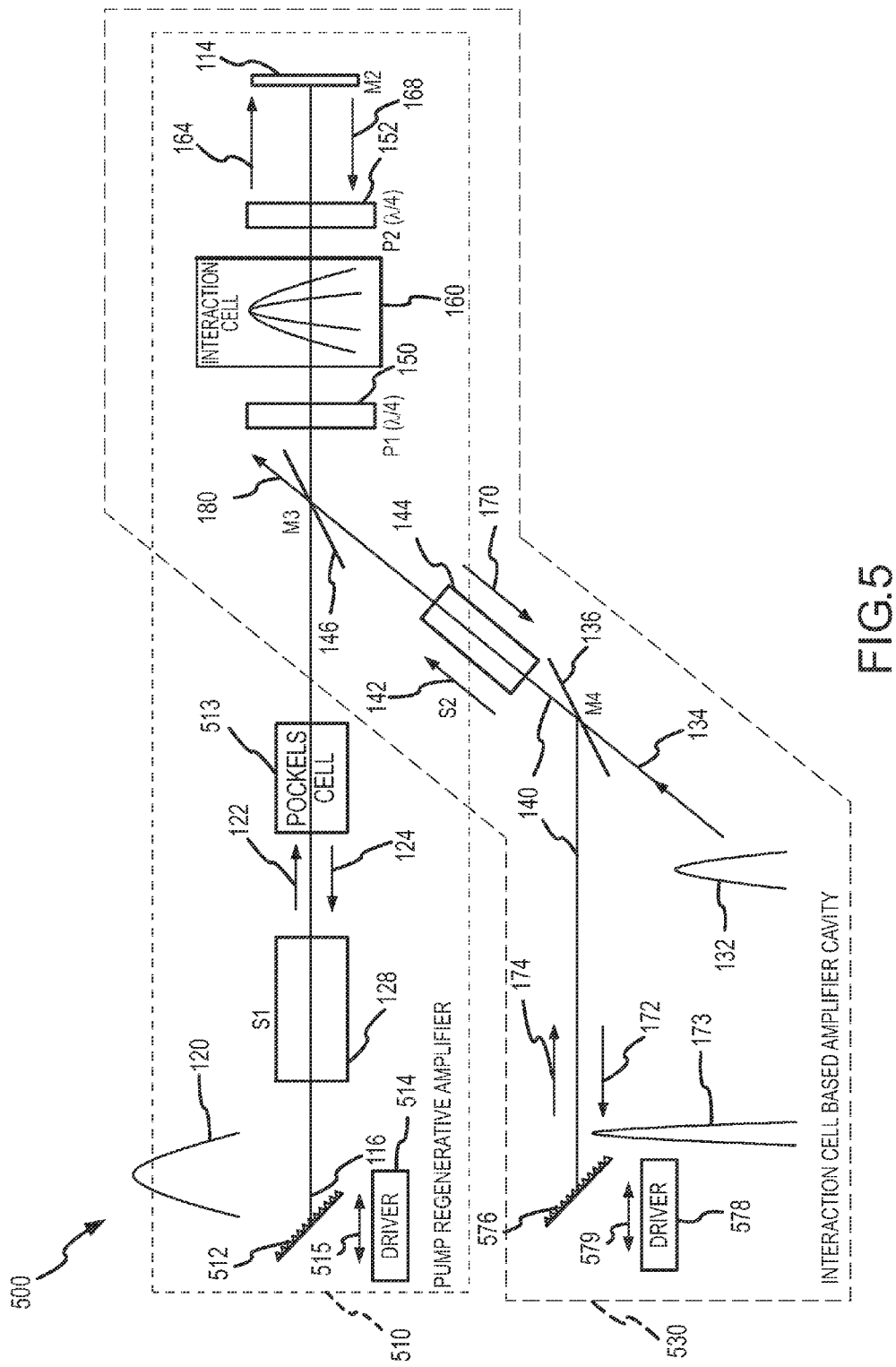
FIG. 5 illustrates a laser amplifier system similar that shown in FIG. 1 illustrating additional features that may be included in certain embodiments.

The above description highlighted the use of Raman amplification, but those skilled in the art will understand the described laser amplification systems can be modified for use with other interaction cells. Further, the laser amplifier systems may be modified to include additional mechanisms such as resonator tuners to achieve desired results. FIG. 5 illustrates a laser amplifier system 500 that has many similarities to the system 100 of FIG. 1, and components provided in system 100 are shown with like numbering and are not described in detail at this point. The system 500 includes a regenerative amplifier 510 and an interaction cell-based amplifier 530 with overlapping cavities. As with system 100, an interaction cell 160 is provided for achieving interaction between an amplifier pulse 120 provided by regenerative amplifier 510 and an input or seed pulse 132 provided by the interaction cell-based amplifier 530. The interaction cell 160 and system 500 may be adapted to provide interactions between these pulses either as co-propagating beams or as counter-propagating beams. The interaction cell 160 may be a Raman cell but in other cases the cell 160 may be adapted for parametric coupling, may include an active gain medium, or may utilize a nonlinear coupling processes (e.g., Raman or other processes).

In system 500, the cavities of the amplifiers 510, 530 are defined in part by cavity end components 512, 576, which may be mirrors as discussed for system 100 or may take different forms. For example, one or both of the cavity end components 512, 576 may take the form of diffraction grating (or another dispersion element) and such grating may be tunable to all for independent tuning of the wavelengths of pulses on the optical paths 116, 140. For example, the wavelengths of the two coupled resonators of amplifiers 510, 530 may be tuned by setting or tuning the components 512, 576 to the energy-coupling process being provided or used in the interaction cell 160. In other cases, one or both of the components 512, 576 may include a chirp mirror to provide pulse shaping. In yet other embodiments, one or both of the components 512, 576 may include a SAM mirror ("saturable absorber mirrors"; e.g., a mirror combined with a Q switch).

The regenerative amplifier 510 may include in the switch 128 or as a separate component a Pockels cell 513 to provide independent switching of pulses 122, 124 (e.g., second channel switching in regenerative amplifier 510). System 500 further includes drivers 514, 578 for selectively positioning the cavity end components 512, 576 (e.g., diffraction grating, mirror, or the like) as shown by arrows 515, 579, respectively. The drivers 514, 578 are provided to allow the length of the resonator or pulse path in each of the amplifiers 510, 530 to be tuned. In this manner, the energy transfer or beam interaction can be maximized or set at a desired level within the interaction cell 160. In one embodiment, the drivers 514, 578 include piezoelectric drivers but, of course, other positioning devices may be used to tune the length of the resonators.

The above embodiments show and describe various means for implementing the utility of laser pulse amplification. The invention, however, is not be limited to any particular embodiment as each embodiment (or various combinations and/or modifications thereof) may provide certain advantages based on a requisite implementation or design. In this regard, the above utility provides certain advantages not previously attainable. For example, the optics used in prior regenerative amplifiers generally had peak power damage thresholds that may be exceeded by perturbations in the beam as it transits the optical path. In these cases, the optics may be damaged and thereby cause loss in efficiency of a regenerative amplifier. The utility generally addresses such shortcomings because, among other reasons, an interaction cell is used in place of optics. For example, since the interaction cell of the utility can be configured as a plasma or a gas, there is generally no structural damage that can occur to the cell.

Another limitation of prior regenerative amplifiers regards the multi-pass aspects of the laser systems. For example, in multi-pass laser systems (e.g., systems such as CPA lasers that involve a number of trips on the optical path and repetitive pulsed operation), the average power dissipated in a given optical element can be relatively high. As a result, the average power threshold of a given device can limit the output power of the amplifier. The utility described herein may overcome such loss because, among other reasons, laser pulse amplification is achieved via an interaction cell which virtually eliminates the need for certain optics (e.g., pulse stretching optics and/or pulse compression optics).

Another exceptionally unique aspect of the utility regards its "power tunability". For example, overall pulse amplification of the prior laser systems generally relied solely on the energy of the pump laser to increase the gain of an output laser pulse. While the utility described herein may also use a pump laser for laser pulse application, amplification of the output laser pulses is now tunable according to the wavelength of the pump laser. For example, optical energy in the form of laser pulses has electric and magnetic fields along the path of propagation of the optical energy. The wavelength of the optical energy, and thus the wavelength of the electric field, affects electrons within the interaction cell and thereby varies the index of refraction of the cell. The "tunable" index of refraction of the cell thus provides a controllable interference process within the cell that amplifies laser pulses according to the wavelength of the pump laser. Such a process may be generally referred to as a transient energy transfer that results in a direct amplification of laser pulses and directional power flow without the need for pulse stretching and/or compression found in common CPA lasers.

What is claimed is:

1. An optical amplifier, including:
a gain medium operable to impart gain on a seed laser pulse;
a pump laser cavity operable to propagate a pump laser pulse through the gain medium multiple times; and
a seed laser cavity operable to propagate the seed laser pulse through the gain medium multiple times,
wherein the gain medium is configured in a portion of the pump laser cavity that coincides with a portion of the seed laser cavity and wherein the pump laser pulse and the seed laser pulse propagate through the gain medium along a same general beam path,
wherein the gain medium includes a Raman interaction cell operable to provide Raman interaction between the seed laser pulse and the pump laser pulse,
wherein the optical amplifier further includes a mirror for injecting the pump laser pulse and the seed laser pulse into a first port of the Raman interaction cell and a mirror for injecting the pump laser pulse and the seed laser pulse into a second port opposite the first port of the Raman interaction cell,
wherein the mirrors are configured to control shapes of the pulses to increase an amount of energy transferred from the pump laser pulse to the seed laser pulse during the Raman interaction,
wherein the optical amplifier further includes a mirror for injecting the pump laser pulse and the seed laser pulse into a first port of the Raman interaction cell and a mirror for injecting the pump laser pulse and the seed laser pulse into a second port opposite the first port of the Raman interaction cell, and
wherein the mirrors are configured to control shapes of the pulses to increase an amount of energy transferred from the pump laser pulse to the seed laser pulse during the Raman interaction.

2. The optical amplifier of claim 1, wherein the Raman interaction cell is configured from plasma, gas, dye, crystal, or liquid.

3. The optical amplifier of claim 1, wherein the seed laser pulse transits through the Raman interaction cell at least twice and interacts with the pump laser pulse during each of the transits.

4. The optical amplifier of claim 1, wherein the Raman interaction occurs in the Raman interaction cell during counter-propagation of the seed laser pulse and the pump laser pulse.

5. The optical amplifier of claim 1, wherein the Raman interaction occurs in the Raman interaction cell during co-propagation of the seed laser pulse and the pump laser pulse.

6. The optical amplifier of claim 1, wherein the pump laser cavity includes first and second mirrors on opposite sides of the Raman interaction cell for oscillating the pump laser pulse within the pump laser cavity through the Raman interaction cell.

7. The optical amplifier of claim 6, wherein the seed laser cavity includes a third mirror positioned outside the pulse laser cavity that, with the second mirror of the pulse laser cavity, defines an optical path for the seed laser pulse to oscillate in the seed laser cavity through the Raman interaction cell.

8. The optical amplifier of claim 7, wherein the seed laser cavity further includes a switch assembly for ejecting the seed laser pulse after a select number of passes through the Raman interaction cell.

9. The optical amplifier of claim 8, wherein the switch assembly includes a polarization rotator for rotating polarization of the seed laser pulse from a first polarization to a second polarization and a polarization dependent mirror with high transmissivity for pulses with the second polarization.

10. The optical amplifier of claim 1, wherein the pulse laser cavity and the seed laser cavity each include a fiber loop connected to the Raman interaction cell, wherein the fiber loop defines an optical path for the laser cavities.

11. The optical amplifier of claim 10, wherein the fiber loop of the seed laser cavity includes a fiber modulator operable to eject the seed laser pulse from the optical amplifier when the seed laser pulse has a magnitude larger than a threshold magnitude.

12. The optical amplifier of claim 1, further including means for adjusting a length of the cavity to synchronize injection of the pump laser pulse and the seed laser pulse into the Raman interaction cell.

13. The optical amplifier of claim 1, wherein injection of the seed laser pulse and the pump laser pulse is synchronized to be substantially concurrent.

14. The optical amplifier of claim 1, wherein the seed laser pulse is injected into the seed laser cavity with a wavelength longer than a wavelength of the laser pulse.

15. The optical amplifier of claim 1, wherein the optical amplifier is a Raman regenerative amplifier.

16. The optical amplifier of claim 1, wherein the pump laser pulse and the seed laser pulse are synchronized to propagate through the gain medium in opposite directions at or about a same time.

17. The optical amplifier of claim 1, wherein the pump laser pulse and the seed laser pulse are synchronized to propagate through the gain medium in a same direction at or about a same time.

* * * * *